United States Patent [19]
Kiuchi et al.

[11] Patent Number: 5,245,312
[45] Date of Patent: Sep. 14, 1993

[54] SELF-TIMER OPERATION INFORMING DEVICE

[75] Inventors: Masayoshi Kiuchi; Hiroyasu Murakami, both of Tokyo, Japan

[73] Assignee: Canon Kabushiki Kaisha, Tokyo, Japan

[21] Appl. No.: 818,405

[22] Filed: Jan. 13, 1986

Related U.S. Application Data

[63] Continuation-in-part of Ser. No. 454,700, Dec. 30, 1982, abandoned.

[30] Foreign Application Priority Data

Jan. 9, 1982 [JP] Japan .................................. 57-1898

[51] Int. Cl.$^5$ ........................... G08B 1/00; G03B 17/00
[52] U.S. Cl. ........................... 340/309.4; 340/309.15; 340/384 R; 340/326; 340/815.21; 354/289.1
[58] Field of Search ............. 340/309.3, 309.4, 309.5, 340/326, 327, 384 A, 384 E, 815.21, 815.22, 309.15; 354/289.1, 289.11, 289.12, 461, 467, 474, 475, 238.1; 356/227; 250/214 AL; 315/129, 149

[56] References Cited

U.S. PATENT DOCUMENTS

| | | | |
|---|---|---|---|
| 3,840,851 | 10/1974 | Fowler et al. ..................... | 340/469 |
| 4,134,660 | 1/1979 | Sakurada et al. ............... | 354/289.12 |
| 4,272,176 | 6/1981 | Maitani et al. .................. | 354/238.1 |
| 4,348,096 | 9/1982 | Katsuma et al. ................ | 354/289.1 |
| 4,459,008 | 7/1984 | Shimizu et al. .................. | 354/238.1 |
| 4,499,453 | 2/1985 | Right ................................ | 340/326 |
| 4,641,937 | 2/1987 | Suzuki ............................. | 354/238.1 |

*Primary Examiner*—Donnie L. Crosland
*Attorney, Agent, or Firm*—Anderson Kill Olick & Oshinsky

[57] ABSTRACT

A self-timer operation informing device, particularly one having an auditory and a visual display device is disclosed. In the case of such information device, since both display devices are always driven in order to carry out the display operation, a problem exists in that the power consumption for the self-timer operation display is large. On the other hand, since it is difficult to confirm the display state by the visual display when the brightness is high, in such cases the auditory display is significant. In other words, the visual display does not have significance under high brightness conditions. A self-timer operation informing device, therefore, selects the driving of the visual or the auditory display device in accordance with the brightness information so as to prevent unnecessary display in order to save the power consumption.

3 Claims, 2 Drawing Sheets

SELF-TIMER OPERATION INFORMING DEVICE

CROSS REFERENCE TO RELATED APPLICATIONS

This application is a continuation-in-part of application Ser. No. 454,700 filed Dec. 30, 1982, now abandoned.

BACKGROUND OF THE INVENTION

1. Field of the Invention

The present invention relates to a self-timer, particularly electronically controlled self-timer operation informing device for informing the operation by means of emission of light and sound.

2. Description of the Prior Art

A method for informing a photographic object of the operation state of the self-timer built in a camera involves visually providing such information by the returning operation of a self-timer setting lever in the case of a camera with a conventional mechanical self-timer. There is no movable part in an electronically controlled self-timer, and visual displaying is mostly performed by an electronically controlled display such as that of an LED. However, it is difficult to confirm the display of the light in bright places such as out doors. That is, it is difficult to display the operation of the self-timer only in a visual way. Thus, recently, not only is an LED display provided but also a sound producing device, such as a buzzer, is built into a camera so that the "display" is made not only by light but also by sound. However, in accordance with the above prior art, the self-timer operation display is always carried out by providing both sound and light so that there takes place a problem of recessive power consumption or of unpleasantness of the sound.

SUMMARY OF THE INVENTION

It is, accordingly an object of the present invention to provide a self-timer operation informing device which detects the circumferential brightness when the self-timer operation is carried out by sound (auditorily) and light (visually) in such a manner that the auditory display is carried out only when the brightness is so high that it is difficult to carry out the self-timer operation display in a visual way.

It is another object of the present invention to provide a self-timer operation informing device which can clearly inform the object of the self-timer operation at any place by detecting the brightness of the place for self-timer photographing in such a manner that in accordance with the brightness information the light emission by LED or the sound emission by buzzer is selectively brought in or out of operation.

Further, other objects and features of the present invention will become apparent from the description hereinbelow made with reference to the accomapnying drawings of the embodiments.

DESCRIPTION OF THE PREFERRED EMBODIMENTS

Below, the present invention will be explained in detail in accordance with the accompanying drawings of the embodiment hereof.

Figure 1:
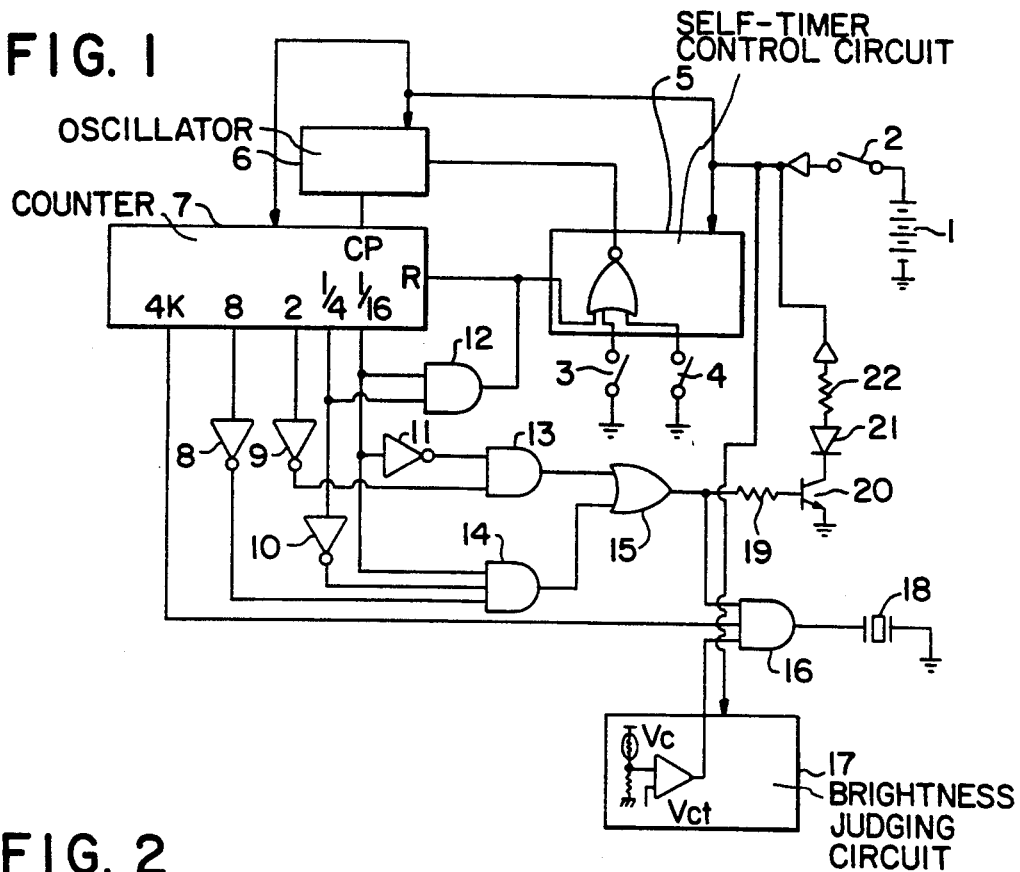
FIG. 1 shows an embodiment of the circuit of the self-timer operation informing device of the present invention.

FIG. 1 shows an embodiment of the circuit of the self-timer operation informing device of the present invention.

In the drawing, 1 is the battery, 2 is the switch for supplying power to each circuit, 3 is the release switch in operative engagement with the release operation member of the camera and 4 the self-timer switch for showing the self-timer photographing mode in operative engagement with the self-timer mode selecting member. Element 5 is the self-timer control circuit for controlling the oscillator 6 and the counter 7 in accordance with the release switch 3 and the self-timer switch, constituting a circuit such as a NOR gate for producing a high level output when both of the above switches are closed. Elements 8-11 are the inverter, 12, 13, 14, 16 the AND gates, 15 the OR gate, 17 the brightness judging circuit for judging the brightness level for comparing the light measurement output by the comparator as is shown, 18 the buzzer, 19 and 22 the resistances and 20 the transistor for driving the LED21.

Below, the operation of the above device will be explained. When the switch 2 is closed the power source 1 delivers power to each circuit. Further, along with the above power supply the power up clear circuit not shown operates so as to bring the counter into the initial state. When the release operation member is operated so as to close the release switch 3 while the self-timer switch 4 is closed, the control circuit 5 produces a high level output so as to operate the oscillator 6. Thus, the oscillator 6 delivers clock pulses, for example pulse signals of 32.768 KHz to the counter 7, which starts counting. Hereby, signals of 1/16 Hz are delivered from the counter 7 to the inverter 11 and the AND gate 14 and in the initial state of the operation of the counter, the counter 7 produces low (0) level signals of 1/16 Hz so that the output of the inverter 11 is "1" (high level) while the AND gate 13 is in the enable state. Further, to the other input of the AND gate 13 the 2 Hz signal inverted by the inverter 9 is delivered so that the same signal as the inverted one of 2 Hz is delivered from the AND gate 13 to the OR gate 15. At the time of the start of the operation of the counter, the signal of 1/16 Hz is "0", so that the AND gate 14 is in the disable state, whereby the "0" output is delivered to the OR gate 15. Thus, the inverted signal of 2 Hz is delivered from the OR gate 15 to the transistor 20 via the resistance 19 so as to close and open the transistor 20. LED21 is lit when the transistor 20 is closed and put out when the transistor 20 is opened, so that LED21 is lit when the signal of 2 Hz is "0" when the signal of 1/16 Hz is "0" and extinguished when the signal of 2 Hz is "1". LED21, thus, flickers at the frequency of 2 Hz at the start of the operation of the self-timer so as to display that the self-timer is in operation. When the brightness is above a certain determined level at the time of the shutter release, the "1" output of the brightness judging circuit 17 is delivered to the AND gate 16. Because a signal of 4 KHz is delivered from the counter 7 to the AND gate 16, when the output of the OR gate 15 is "1", a signal of 4 KHz is delivered to the buzzer 18 so as to produce a sound at the same time with the lighting of the LED. Further, when the brightness is below a certain determined level, the output of the brightness judging circuit 17 is "0" so that the output of the AND gate 16 is "0" and the buzzer 18 produces no sound. Thus, in accordance with the present invention the operation of the self-timer is displayed by the buzzer 18 when the brightness of the circumstance is high. Thus, while the operation of the self-timer is displayed, the signal 1/16 Hz of the counter is "1" a certain determined time before the photographing starts by the self-timer, when the signal of 1/16 Hz of the counter is "1", the output of the inverter 11 is "0", while the output of the AND gate 13 is "0". Further, because the signal of 1/4 Hz is delivered to the AND gate 12 and the inverter 10, an inverted signal of 1/4 Hz is delivered from the inverter 10 to the AND gate 14. Thus, when the signal of 1/16 Hz is "1", the AND gate 14 is in the enable state when the signal of 1/4 Hz is "0". Further, because the signal of 8 Hz of the counter 7 is inverted by the inverter 8 and delivered to the AND gate 14, the inverted signal of 8 Hz is delivered from the AND gate 14 with the result that when the output of 1/16 Hz of the counter is "1", the inverted signal of 8 Hz is delivered from the OR gate 15 to the transistor 20 via the resistance 19. Thus, when the signal of 1/16 Hz is "1", while the signal of 1/4 Hz is "0", LED is lit when the signal of 8 Hz is "0" and extinguish when the signal is "1", namely flickers at the frequency of 8 Hz. That is, immediately before the start of the self-timer photographing, the LED flickers at the frequency of 8 Hz. Further, in the same way as with the flickering of LED, when the brightness is high, the buzzer 18 produces a sound of 4 Hz at the interval of 8 Hz when the output of 1/16 Hz of the counter is "1". Further, because the output of the brightness judging circuit 17 is "0" as described above, when the brightness is below a certain determined level, the output of 1/16 Hz of the counter is "1" so that the buzzer 18 produces no sound.

When along with the counting by the counter the signal of 1/16 Hz is "1" and that of 1/4 Hz changes from "0" into "1", the output of the AND gate 12 is "1" so as to reset the counter 7, while the signal is delivered to the control circuit 5, whose output is "0" so as to stop the operation of the oscillator 6. In this manner, the display of the operation of the self-timer is finished.

Although, in the case of the present embodiment, the self-timer itself is not shown, the conventional self-timer circuit, which is so designed that the output of the oscillator 6 is counted by a counter of the same construction as the counter 7 and the magnet is operated by the "1" output from an AND gate connected in the same way as the AND gate 12 so as to release the shutter, can be used. Further, as the self-timer circuit, the magnet is connected to the output of the above AND gate so as to operate the magnet by the "1" output of the AND gate 12 and release the shutter.

Figure 2:
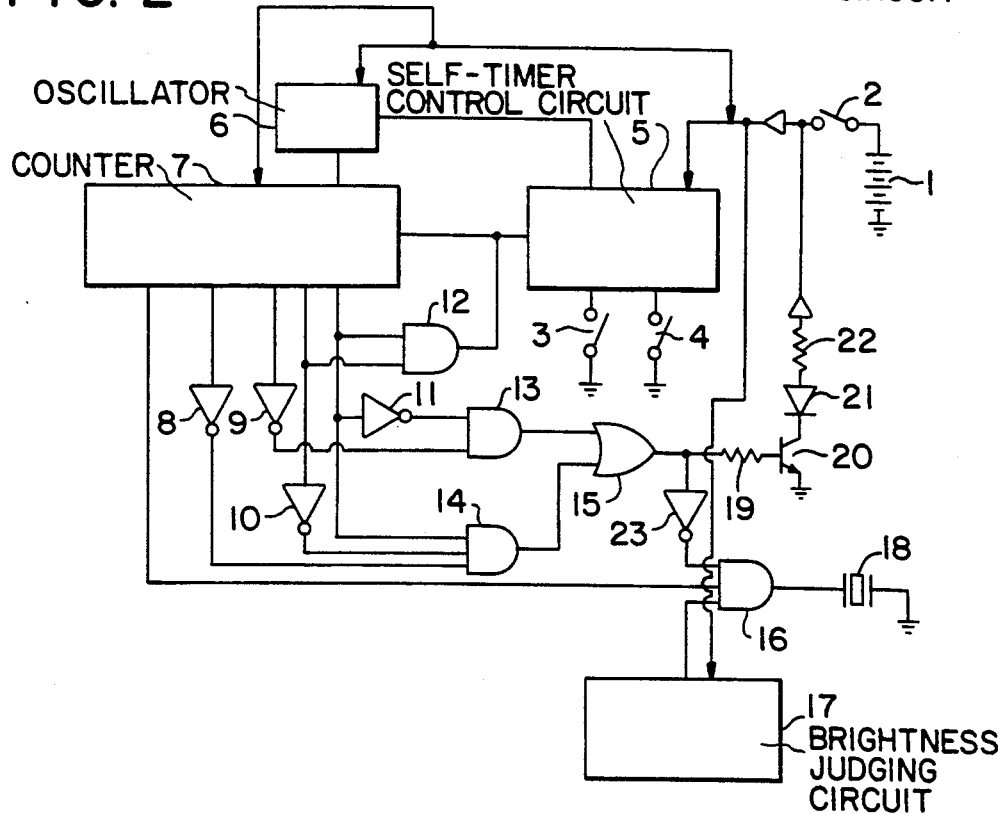
FIG. 2 shows another embodiment of the circuit of the present invention.

FIG. 2 shows another embodiment of the circuit of the present invention, whereby the inverter 23 is added to the circuit in FIG. 1. The difference between the circuit in FIG. 2 and that in FIG. 1 is that when the output of the OR gate 15 is delivered to the AND gate 16 via the inverter 23, the transistor 20 is closed so as to light the LED the output of the brightness judging circuit 17 is "1", namely, when the brightness is high, while the output of the OR gate 15 is "1", whereby because the output of the inverter 23 is "0" the output of the AND gate 16 is "0" and the buzzer 18 produces no sound. On the other hand, when the output of the OR gate 15 is "0", the transistor 20 is opened and the LED is extinguished, whereby because the output of the inverter 23 is "1" the, AND gate 16 delivers an output of 4 Hz and the buzzer produces sounds. Being constructed as described above, in the case of the present embodiment, in the same way as in the case of FIG. 1, the display is carried out by the buzzer when the brightness is high, while the display by the buzzer and by the LED is carried alternatively. Thus, in accordance with the present embodiment, the power consumption for the display operation can be made even.

Other operations of the circuit are the same as those of the circuit in FIG. 1 so that the explanation is omitted here.

Figure 3:
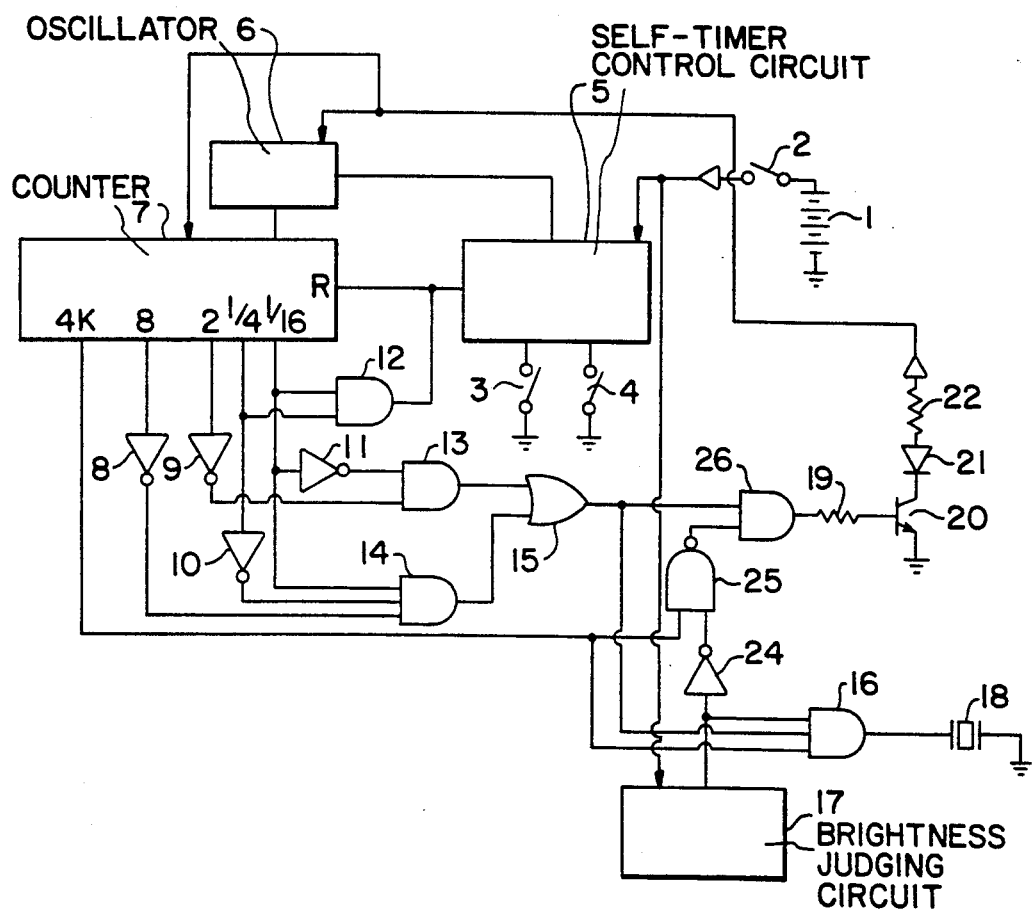
FIG. 3 shows the third embodiment of the circuit of the present invention.

FIG. 3 shows the third embodiment of the circuit of the present invention. The difference between the embodiment in FIG. 3 and that in FIG. 1 is that the inverter 24, the NAND gate 25 and the AND gate 26 constitute the brightness modulation circuit for the LED so as to modulate the brightness of the LED. The operation is as follows. Because the output of the brightness judging circuit 17 is "0" when the brightness is low, the output of the inverter 24 to be delivered to the inverter 24 is "1". Because the signal of 4 KHz is delivered to the other input of the NAND gate 25, the NAND gate 25 delivers an inverted signal of 4 KHz to the AND gate 26, which delivers an inverted signal of 4 KHz when the output of the OR gate 15 is "1". Thus, the LED which is lit is closed and opened at the frequency of 4 KHz. Further, because the output of the inverter 24 is "0" when the output of the brightness judging circuit 17 is "1", namely the brightness is high, the output of the NAND gate 25 is "1" no matter what is the input to the other input so that the LED which is lit has nothing to do with the signal of 4 KHz and flickers in the same way as in the case of the embodiment in FIG. 1. Thus, when the brightness is low, LED carries out the self-timer operation information in the dark state, while when the brightness is high, the LED carries out the information in the bright state. Other operations of the embodiment are the same as those in FIG. 1 so that the explanation is omitted here. Although in the case of the present embodiment the buzzer is operated when the brightness is high, it is possible to always carry out the information by the buzzer and by the LED only when it is dark. In this case, instead of connecting the AND gate 16 to the output of the circuit in FIG. 1, an AND gate to whose one input terminal the output of the OR gate 15 is connected is provided, while the output of the circuit is connected to the other input terminal of the AND gate via the inverter.

Further, it is possible to use the brightness modulation in FIG. 3 in an analog way. For the display element, not only is an LED possible but also liquid crystal or EL (Electro Luminescence) element can be used.

As described above in the case of the device of the present invention the self-timer operation information is carried out in the auditory and the visual way in accordance with the brightness information so that it is possible to always obtain a clear self-timer operation display.

What we claim is:

1. A self-timer operation informing device comprising:
   (a) visual display means;
   (b) auditory display means;
   (c) a brightness discriminating circuit for discriminating the brightness level of ambient light; and
   (d) a control circuit connected to the visual display means and the auditory display means and said brightness discriminating circuit, said control circuit producing a driving signal for operating the visual display means and the auditory display means to indicate a self-timer operation is performing, said circuit including auditory display selecting means for supplying the driving signal to the auditory display means when said brightness discriminating circuit detects that the brightness level is high and for prohibiting to supply the driving signal to the auditory display means when said brightness discriminating circuit detects that the brightness level is low.

2. A self-timer operation informing device comprising:
   (a) visual display means;
   (b) auditory display means;
   (c) a brightness discriminating circuit for discriminating the brightness level of ambient light; and
   (d) a control circuit connected to the visual display means and the auditory display means and providing a driving signal for driving the visual display means and the auditory display means when the self-timer is in operation, the control circuit including prohibiting means connected to said auditory display means and said brightness discriminating circuit, said prohibiting means prohibiting the driving of the auditory display means when said brightness discriminating circuit detects that the brightness level is low.

3. A self-timer operation informing device comprising:
   (a) visual display means;
   (b) auditory display means;
   (c) a brightness discriminating circuit for discriminating the brightness level of ambient light;
   (d) a control circuit connected to said visual display means and auditory display means and said brightness discriminating circuit for driving said visual display means and said auditory display means; and
   (e) selecting means connected to said control circuit, said selecting means selecting at least one of said auditory display means and the visual display means depending on the detected level of brightness by said brightness discriminating circuit and driving the selected display means by said control circuit.

* * * * *